(12) United States Patent
Terada (10) Patent No.: US 11,572,147 B2
(45) Date of Patent: Feb. 7, 2023

(54) SYSTEM FOR OPERATING WATERCRAFT, METHOD THEREOF AND WATERCRAFT

(71) Applicant: YAMAHA HATSUDOKI KABUSHIKI KAISHA, Iwata (JP)

(72) Inventor: Kohei Terada, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 148 days.

(21) Appl. No.: 17/090,937

(22) Filed: Nov. 6, 2020

(65) Prior Publication Data
US 2021/0261229 A1 Aug. 26, 2021

(30) Foreign Application Priority Data

Feb. 21, 2020 (JP) .............................. JP2020-028704

(51) Int. Cl.
*B63H 25/04* (2006.01)
*B63C 1/04* (2006.01)
*G05D 1/02* (2020.01)
*H04N 7/18* (2006.01)
*B63B 49/00* (2006.01)

(52) U.S. Cl.
CPC .............. *B63H 25/04* (2013.01); *B63C 1/04* (2013.01); *G05D 1/0206* (2013.01); *H04N 7/181* (2013.01); *B63B 49/00* (2013.01)

(58) Field of Classification Search
CPC ... B63H 25/04; B63H 11/11; B63H 2011/081; B63C 1/04; G05D 1/0206; H04N 7/181; B63B 49/00; G01C 21/04
USPC ............................................................ 701/21
See application file for complete search history.

(56) References Cited

U.S. PATENT DOCUMENTS

| 2018/0321685 | A1* | 11/2018 | Yalla | G08G 1/147 |
| 2020/0098135 | A1* | 3/2020 | Ganjineh | G06T 7/74 |
| 2020/0166947 | A1* | 5/2020 | Homoceanu | G06F 16/383 |
| 2021/0269128 | A1* | 9/2021 | Rivers | B63B 79/40 |
| 2021/0347449 | A1* | 11/2021 | Dake | G01S 17/93 |

* cited by examiner

*Primary Examiner* — Thai Q Tran
*Assistant Examiner* — Stephen R Smith
(74) *Attorney, Agent, or Firm* — Keating and Bennett, LLP (57) ABSTRACT

A camera produces image data representing an image of a surrounding view of a watercraft. A controller obtains the image data. The controller recognizes an image representing a specific mark in the image data. With reference to a control data set, the controller obtains watercraft operating information associated with the specific mark recognized in the image data. The control data set defines a relationship between the specific mark and the watercraft operating information.

12 Claims, 7 Drawing Sheets

| SPECIFIC MARK | WATERCRAFT OPERATING INFORMATION |
|---|---|
| 41 → A | DOCKING POSITION |
| 42 → B | ANGLE OF APPROACH |
| 43 → C | ROUTE OF WATERCRAFT |
| 44 → D | TRESPASSING FORBIDDEN AREA |
| 45 → E | TRAILER POSITION |

FIG. 7

SYSTEM FOR OPERATING WATERCRAFT, METHOD THEREOF AND WATERCRAFT

CROSS REFERENCE TO RELATED APPLICATIONS

This application claims the benefit of priority to Japanese Patent Application No. 2020-028704 filed on Feb. 21, 2020. The entire contents of this application are hereby incorporated herein by reference.

BACKGROUND OF THE INVENTION

1. Field of the Invention

The present invention relates to a system for operating a watercraft, a method thereof, and a watercraft.

2. Description of the Related Art

Some types of watercraft operation require sophisticated skills. For example, appropriately docking a watercraft to a docking position (e.g., quay, pier, etc.) is not easy. Information for watercraft operation, especially, size of the docking position, appropriate angle of approach toward the docking position, and so forth, varies among harbors. It is difficult to preliminarily obtain such information for watercraft operation as described above with regard to a harbor with which a watercraft operator is not familiar.

Incidentally, some harbors set an area that any watercraft is forbidden to trespass. However, chances are that a watercraft operator has difficulty in grasping the existence of such a trespassing forbidden area in an unfamiliar harbor. Therefore, it is not easy for the watercraft operator to operate a watercraft in an unfamiliar harbor.

In recent years, there have been provided automated control technologies for automatically moving a watercraft by a controller. However, when the controller has not stored the above-mentioned information for watercraft operation in association with a given harbor, it is difficult to operate the watercraft under automated control in the harbor.

SUMMARY OF THE INVENTION

Preferred embodiments of the present invention provide systems for operating watercraft and methods thereof, such that operating the watercraft is easily performed even without preliminarily obtaining operation information for watercraft.

A system according to a preferred embodiment of the present invention includes a camera and a controller. The camera shoots a surrounding view of the watercraft. The camera produces image data representing an image of the surrounding view of the watercraft. The controller obtains the image data. The controller recognizes an image representing a specific mark in the image data. With reference to a control data set, the controller obtains watercraft operating information associated with the specific mark recognized in the image data. The control data set defines a relationship between the specific mark and the watercraft operating information.

A method according to a preferred embodiment of the present invention includes the following processes. A first process includes obtaining image data representing an image of a surrounding view of the watercraft. A second process includes recognizing an image representing a specific mark in the image data. A third process includes obtaining watercraft operating information associated with the specific mark recognized in the image data with reference to a control data set. The control data set herein defines a relationship between the specific mark and the watercraft operating information.

A watercraft according to a preferred embodiment of the present invention includes a camera and a controller. The camera shoots a surrounding view of the watercraft. The camera produces image data representing an image of the surrounding view of the watercraft. The controller obtains the image data. The controller recognizes an image representing a specific mark in the image data. With reference to a control data set, the controller obtains watercraft operating information associated with the specific mark recognized in the image data. The control data set defines a relationship between the specific mark and the watercraft operating information.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
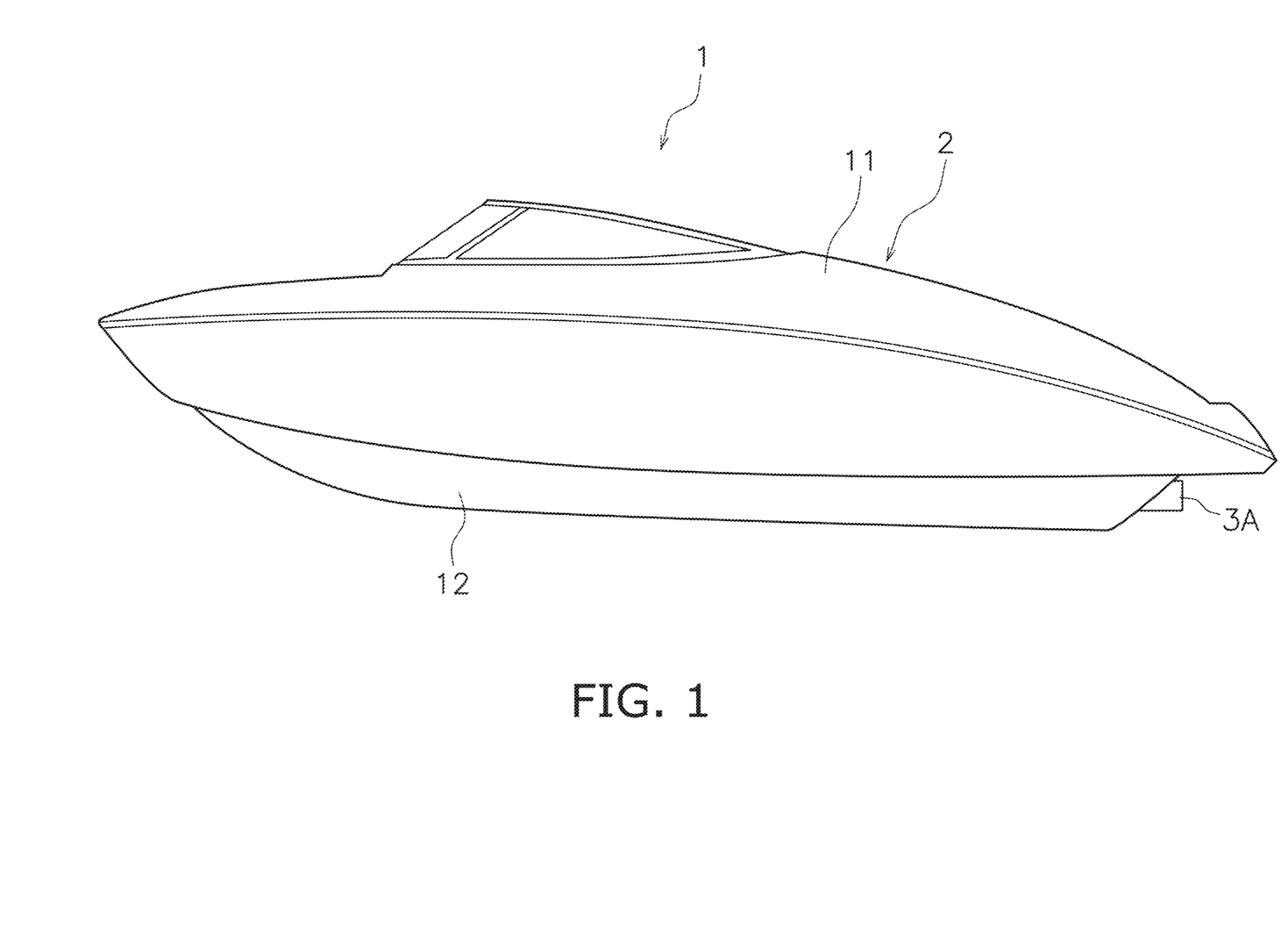
FIG. 1 is a side view of a watercraft according to a preferred embodiment of the present invention.
Figure 2:
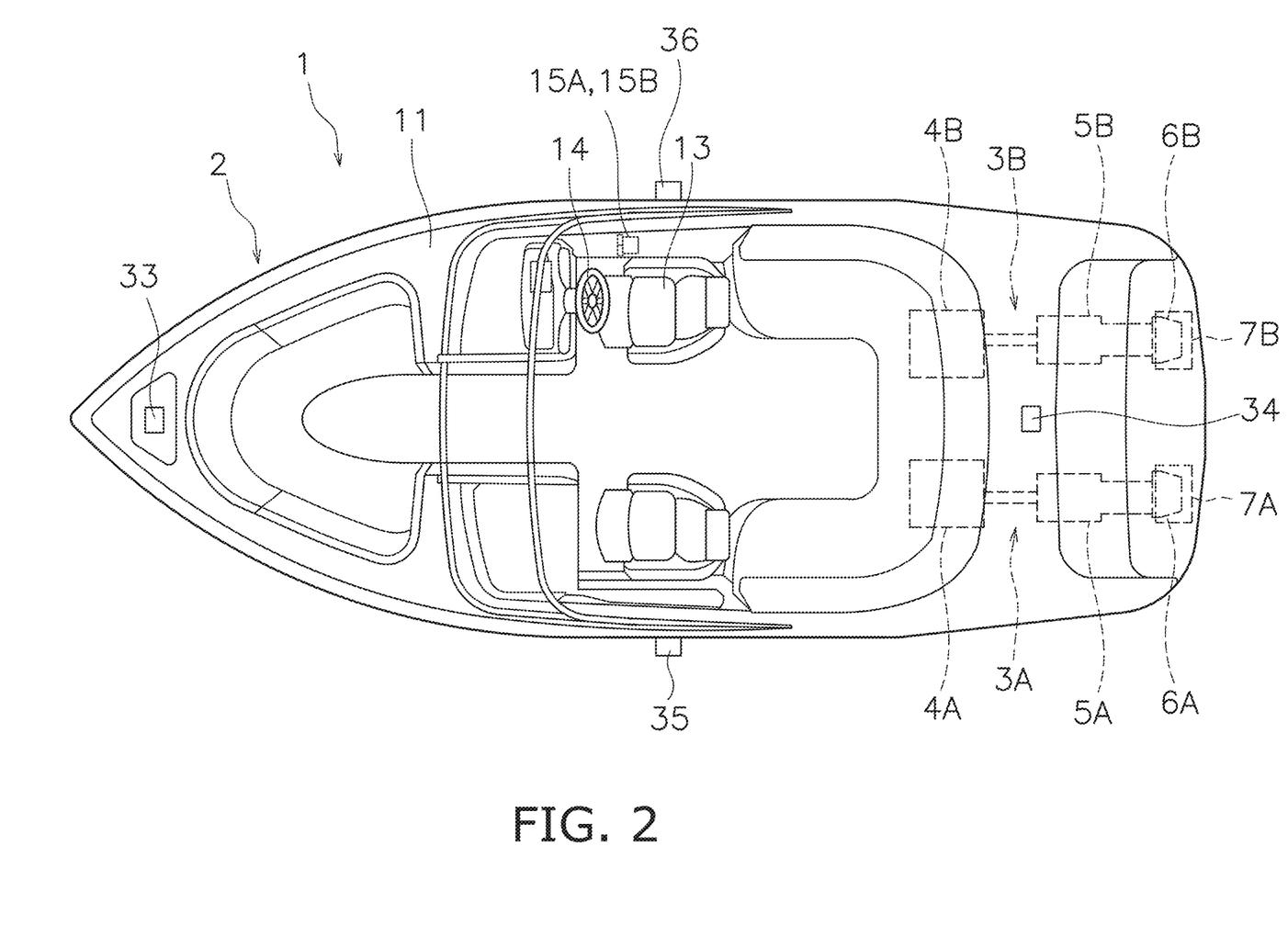
FIG. 2 is a top view of the watercraft.

Watercraft according to preferred embodiments of the present invention will be hereinafter explained with reference to the drawings. FIG. 1 is a side view of a watercraft 1 according to a preferred embodiment of the present invention. FIG. 2 is a top view of the watercraft 1. In the present preferred embodiment, the watercraft 1 is a type of watercraft called a jetboat or a sport boat.

The watercraft 1 includes a vessel body 2, a left propulsion device 3A, and a right propulsion device 3B. The vessel body 2 includes a deck 11 and a hull 12. The hull 12 is located below the deck 11. A cockpit 13 is located on the deck 11. The left and right propulsion devices 3A and 3B are attached to the vessel body 2. The left and right propulsion devices 3A and 3B are, for example, jet propulsion devices.

Figure 3:
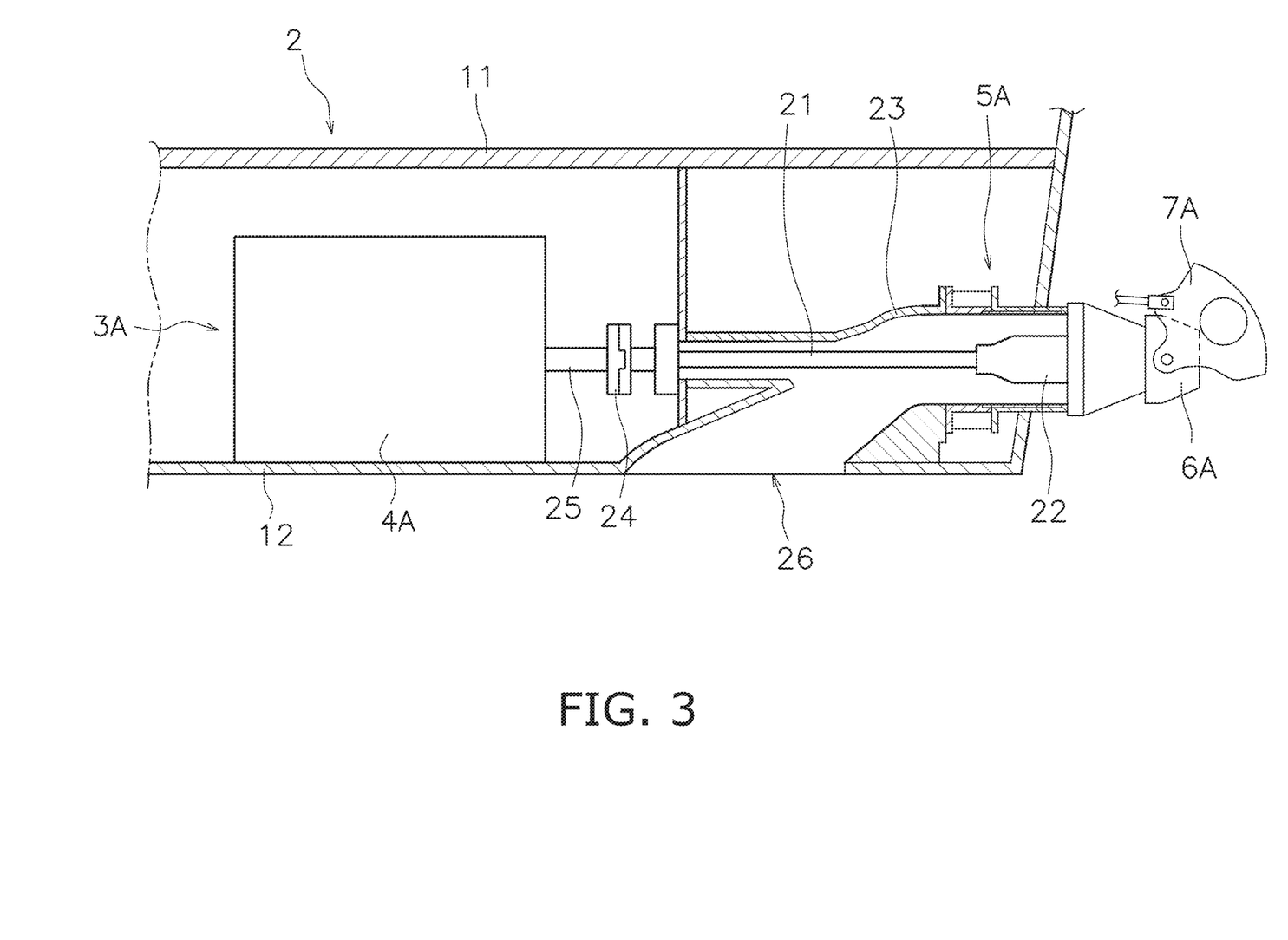
FIG. 3 is a cross-sectional side view of the watercraft.

FIG. 3 is a cross-sectional side view of the watercraft 1. FIG. 3 shows a portion of the left propulsion device 3A in a cross-sectional representation. As shown in FIG. 3, the left propulsion device 3A is accommodated in the vessel body 2. The left propulsion device 3A includes a left engine 4A, a first jet pump 5A, a first nozzle 6A, and a first reverse gate 7A. The left engine 4A is connected to the first jet pump 5A. The first jet pump 5A is driven by the left engine 4A in order to suck in and spout out water in the surroundings of the vessel body 2. Accordingly, the first jet pump 5A generates a thrust to move the vessel body 2.

The first jet pump 5A includes a drive shaft 21, an impeller 22, and a pump housing 23. The drive shaft 21 is connected to an output shaft 25 of the left engine 4A through a coupling 24. The impeller 22 is connected to the drive shaft 21. The impeller 22 is located inside the pump housing 23. The impeller 22 is rotated together with the drive shaft 21 in order to draw in water through a water suction port 26. The impeller 22 backwardly spouts out the drawn in water through a spout port of the pump housing 23.

The first nozzle 6A is located behind the first jet pump 5A. The first nozzle 6A is swingable to the right and left. The first nozzle 6A changes the direction of water spouted out from the first jet pump 5A in a right-and-left direction. The first reverse gate 7A is located behind the first nozzle 6A. The first reverse gate 7A is located such that the position thereof is switchable between a forward moving position and a backward moving position. When the position of the first reverse gate 7A is switched between the forward moving position and the backward moving position, the direction of the stream of water spouted out from the first jet pump 5A is changed. Movement of the watercraft 1 is thus switched between forward movement and backward movement.

The right propulsion device 3B has a configuration similar in manner to the left propulsion device 3A. As shown in FIG. 2, the right propulsion device 3B includes a right engine 4B, a second jet pump 5B, a second nozzle 6B, and a second reverse gate 7B. The right engine 4B, the second jet pump 5B, the second nozzle 6B, and the second reverse gate 7B have a configuration similar in manner to the left engine 4A, the first jet pump 5A, the first nozzle 6A, and the first reverse gate 7A, respectively. Thus, detailed explanation thereof will be hereinafter omitted.

Figure 4:
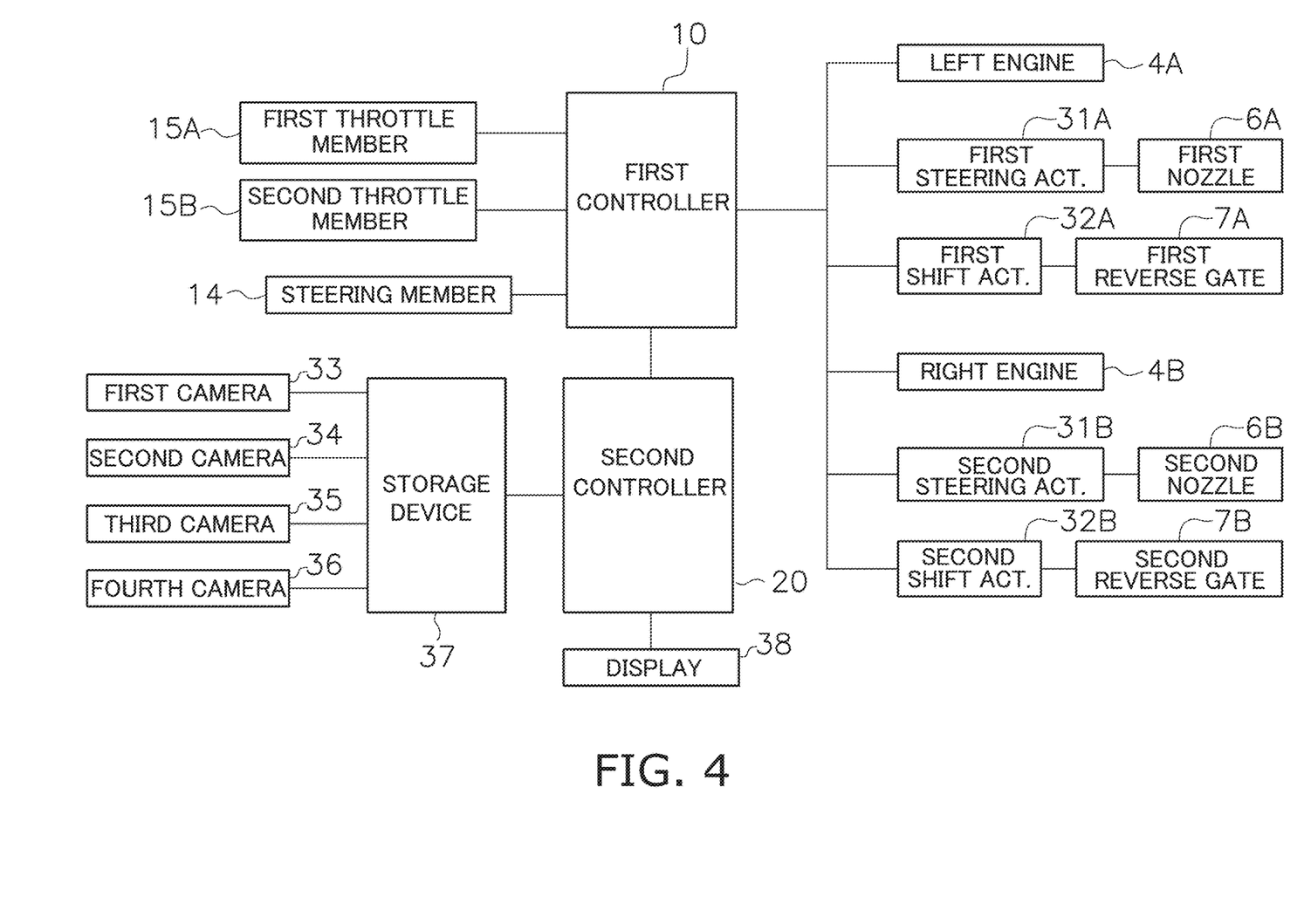
FIG. 4 is a schematic diagram showing a system for operating the watercraft.

FIG. 4 is a schematic diagram showing a system to operate the watercraft 1. As shown in FIG. 4, the watercraft 1 includes a first controller 10. The first controller 10 includes a processor such as a CPU (Central Processing Unit) and memories such as a RAM (Random Access Memory) and a ROM (Read Only Memory). The first controller 10 is configured or programmed to control the watercraft 1.

The watercraft 1 includes a first steering actuator 31A and a first shift actuator 32A. The first controller 10 is connected to the left engine 4A, the first steering actuator 31A, and the first shift actuator 32A in a communicable manner.

The first steering actuator 31A is connected to the first nozzle 6A of the left propulsion device 3A. The first steering actuator 31A changes the nozzle angle of the first nozzle 6A. The nozzle angle of the first nozzle 6A is an angle defined by an imaginary line, extended backward from the axis of the first nozzle 6A, with respect to the back-and-forth direction of the watercraft 1. The first steering actuator 31A includes, for instance, an electric motor. Alternatively, the first steering actuator 31A may be another type of actuator such as a hydraulic cylinder.

The first shift actuator 32A is connected to the first reverse gate 7A of the left propulsion device 3A. The first shift actuator 32A switches the position of the first reverse gate 7A between the forward moving position and the backward moving position. The first shift actuator 32A includes, for instance, an electric motor. Alternatively, the first shift actuator 32A may be another type of actuator such as a hydraulic cylinder.

The watercraft 1 includes a second steering actuator 31B and a second shift actuator 32B. The second steering actuator 31B is connected to the second nozzle 6B of the right propulsion device 3B. The second shift actuator 32B is connected to the second reverse gate 7B of the right propulsion device 3B. The second steering actuator 31B and the second shift actuator 32B have a configuration similar in manner to the first steering actuator 31A and the first shift actuator 32A, both of which are described above. The first controller 10 is connected to the right engine 4B, the second steering actuator 31B, and the second shift actuator 32B in a communicable manner.

The watercraft 1 includes a steering member 14, a first throttle member 15A, and a second throttle member 15B. The first controller 10 is connected to the steering member 14, the first throttle member 15A, and the second throttle member 15B in a communicable manner. The steering member 14, the first throttle member 15A, and the second throttle member 15B are located in the cockpit 13.

Each of the first and second throttle members 15A and 15B is operated to regulate the output from a corresponding one of the left and right engines 4A and 4B and to switch between forward movement and backward movement. The first and second throttle members 15A and 15B each include a lever. However, the first and second throttle members 15A and 15B may each include a different type of member from the lever, such as a switch.

The first controller 10 controls the rotational speed of the left engine 4A in accordance with the operating amount of the first throttle member 15A. The first controller 10 controls the rotational speed of the right engine 4B in accordance with the operating amount of the second throttle member 15B. The first controller 10 controls the first shift actuator 32A in accordance with the operating direction of the first throttle member 15A. Accordingly, the direction of the thrust generated by the left propulsion device 3A is switched between the forward moving direction and the backward moving direction. The first controller 10 controls the second shift actuator 32B in accordance with the operating direction of the second throttle member 15B. Accordingly, the direction of the thrust generated by the right propulsion device 3B is switched between the forward moving direction and the backward moving direction.

The steering member 14 is operated to steer the watercraft 1. In other words, the first controller 10 controls the bow direction of the watercraft 1 in accordance with the operation of the steering member 14. The first controller 10 controls the first steering actuator 31A in order to control the nozzle angle of the left propulsion device 3A. The first controller 10 controls the second steering actuator 31B in order to control the nozzle angle of the right propulsion device 3B. The bow direction of the watercraft 1 is thus changed to the right and left.

The watercraft 1 includes a plurality of cameras 33 to 36, a second controller 20, a storage 37, and a display 38. The plurality of cameras 33 to 36 shoot surrounding views of the watercraft 1. The plurality of cameras 33 to 36 generate a plurality of pieces of image data that represent images of the surrounding views of the watercraft 1. As shown in FIG. 2, the plurality of cameras 33 to 36 include a first camera 33, a second camera 34, a third camera 35, and a fourth camera 36. The first camera 33 is attached to a front portion of the vessel body 2. The first camera 33 shoots a forward view from the vessel body 2 and generates image data indicative of the forward view. The second camera 34 is attached to a rear portion of the vessel body 2. The second camera 34 shoots an aft view from the vessel body 2 and generates image data indicative of the aft view. The third camera 35 is attached to a port portion of the vessel body 2. The third camera 35 shoots a port-side view from the vessel body 2 and generates image data indicative of the port-side view. The fourth camera 36 is attached to a starboard portion of the vessel body 2. The fourth camera 36 shoots a starboard-side view from the vessel body 2 and generates image data indicative of the starboard-side view.

The storage 37 stores the image data generated by the plurality of cameras 33 to 36. The storage 37 may include a semiconductor memory such as an SSD (Solid State Drive). Alternatively, the storage 37 may include a magnetic storage medium such as an HDD or an optical storage medium. The second controller 20 includes a processor such as a CPU or a GPU (Graphics Processing Unit) and memories such as a RAM and a ROM. The second controller 20 is configured or programmed to control the watercraft 1. The display 38 displays images of the surrounding views of the watercraft 1 based on the image data generated by the cameras 33 to 36. The display 38 is, for instance, an LCD (Liquid Crystal Display) or an OELD (Organic Electro-Luminescence Display).

Figure 5:
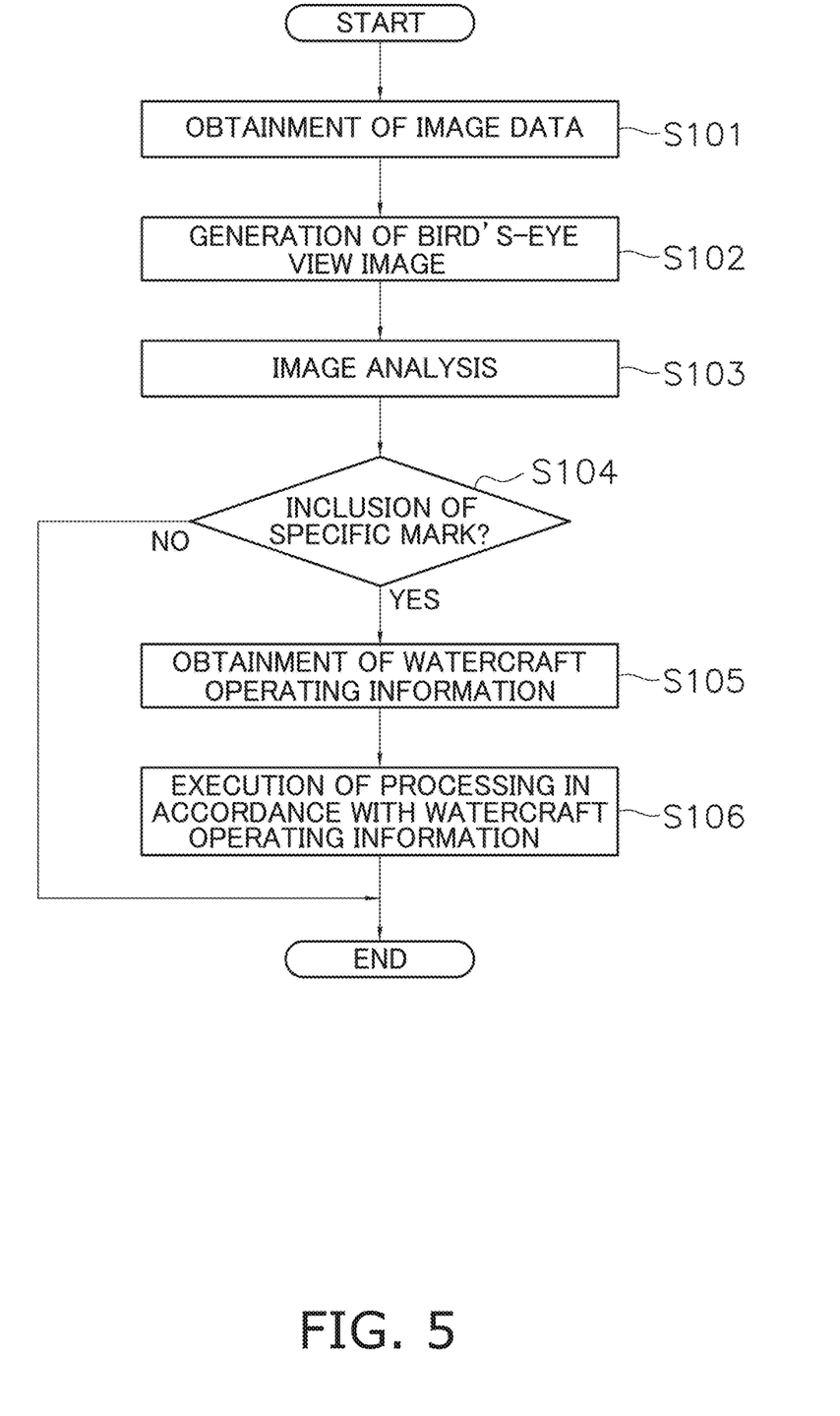
FIG. 5 is a flowchart showing processes to be executed by a second controller.

The second controller 20 obtains the image data from the plurality of cameras 33 to 36. The second controller 20 recognizes an image that represents a specific mark in the image data and executes processes in accordance with watercraft operating information associated with the specific mark. The processes to be executed by the second controller 20 will be hereinafter explained. FIG. 5 is a flowchart showing the processes to be executed by the second controller 20.

As shown in FIG. 5, in step S101, the second controller 20 obtains the image data. As described above, the image data generated by the cameras 33 to 36 are stored in the storage 37. The second controller 20 obtains the image data from the storage 37.

Figure 6:
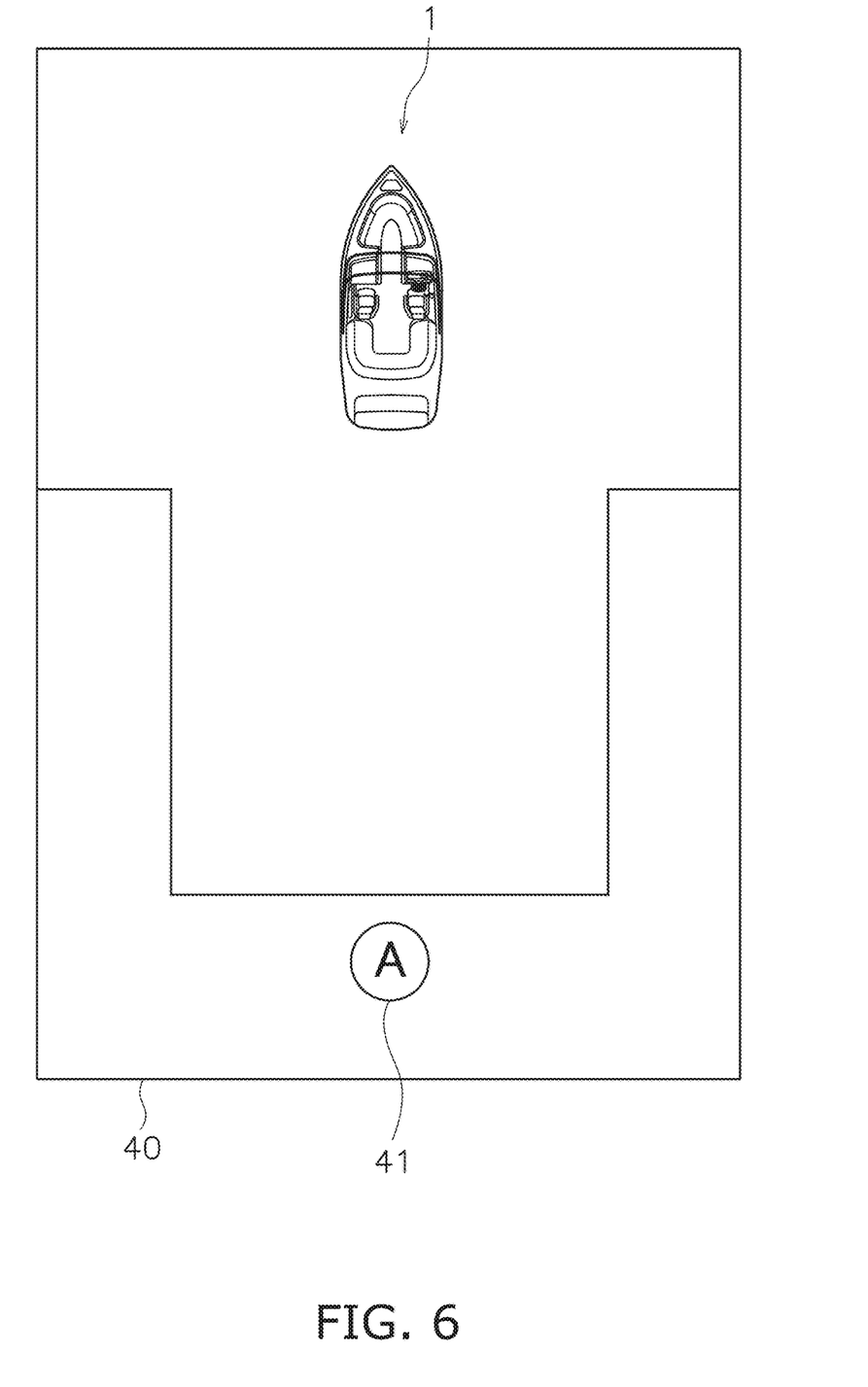
FIG. 6 is a diagram exemplifying a bird's-eye view image.

In step S102, the second controller 20 generates a bird's-eye view image by integrating the image data generated by the cameras 33 to 36. FIG. 6 is a diagram exemplifying a bird's-eye view image 40. The bird's-eye view image 40 is an image representing the watercraft 1 and the surroundings thereof as seen from above. The watercraft 1 shown in the bird's-eye view image 40 may be an actual image of the watercraft 1, or alternatively, a CG (Computer Graphics) model indicative of the watercraft 1.

In step S103, the second controller 20 executes an image analysis. The second controller 20 executes the image analysis using a technology of, for instance, pattern matching, AI (Artificial Intelligence), or so forth.

Figure 7:
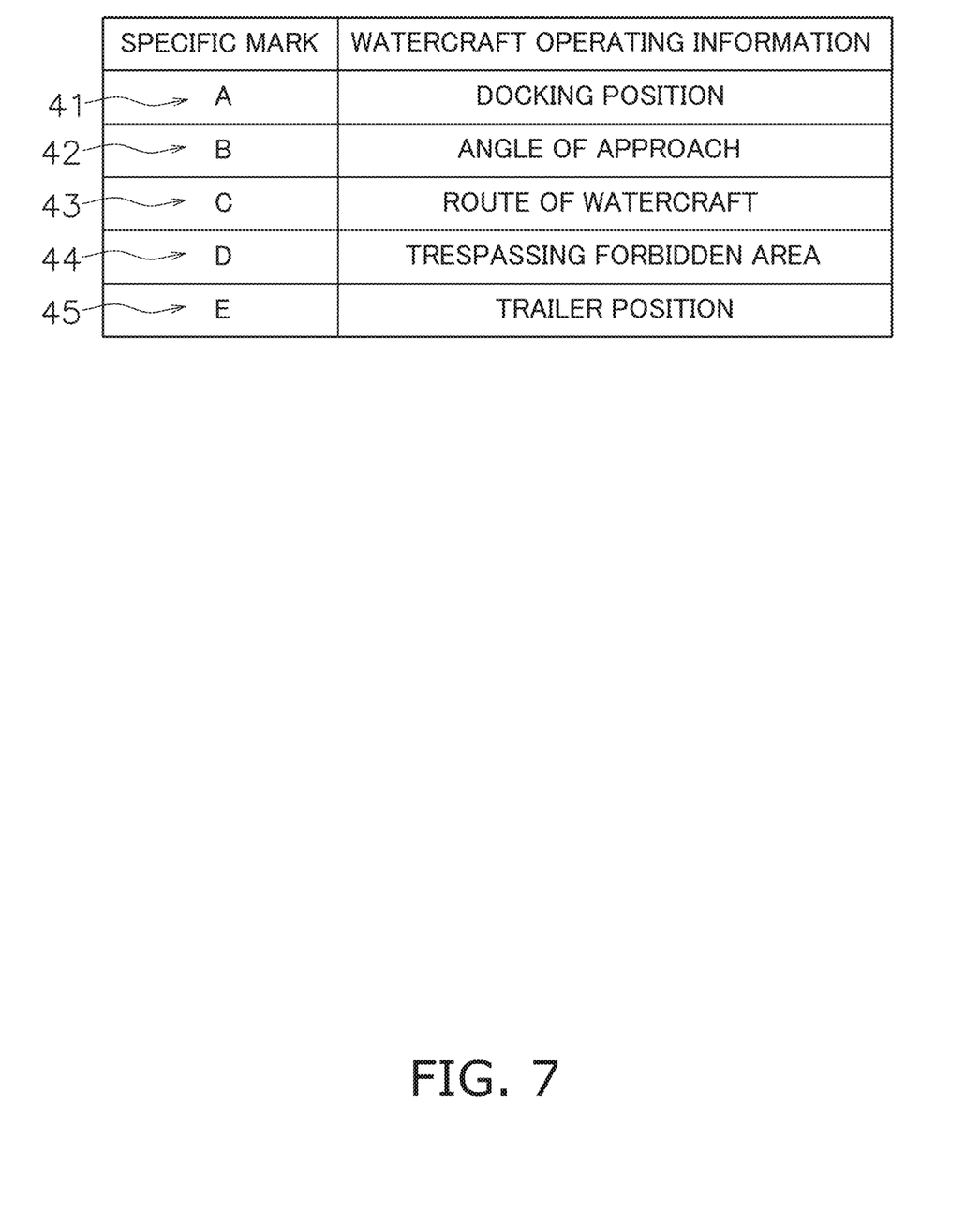
FIG. 7 is a table exemplifying a control data set.

In step S104, the second controller 20 determines whether or not a specific mark 41 exists in the image 40 as a result of the image analysis. The storage 37 stores a control data set defining a relationship between a specific mark 41 and watercraft operating information to operate the watercraft 1. The second controller 20 identifies whether or not the specific mark 41, defined in the control data set, is included in the image 40. FIG. 7 is a table exemplifying the control data set. As shown in FIG. 7, the control data set stores the plurality of specific marks 41 to 45 and the plurality of pieces of watercraft operating information associated with the specific marks 41 to 45, respectively. The specific marks 41 to 45 are not limited to characters and may be diagrams identified based on patterns, colors, or shapes.

When the second controller 20 recognizes one of the specific marks 41 to 45 in the image 40, the process proceeds to step S105. In step S105, the second controller 20 obtains a relevant one of the plurality of pieces of watercraft operating information. With reference to the control data set, the second controller 20 obtains one of the pieces of watercraft operating information, which is associated with the one of the specific marks 41 to 45, i.e., the specific mark recognized in the image data. The pieces of watercraft operating information include, for instance, a docking position, an angle of approach, a route of the watercraft 1, a trespassing forbidden area, and a trailer position. The information of the docking position indicates that a location indicated by the specific mark 41 is a docking position of the watercraft 1 (e.g., pier). The information of the angle of approach indicates an angle of approach to the docking position of the watercraft 1 at a location indicated by the specific mark 42. The information of the route of the watercraft 1 indicates a route to the docking position of the watercraft 1 at a location indicated by the specific mark 43. The information of the trespassing forbidden area indicates that a location indicated by the specific mark 44 is a trespassing forbidden area. The information of the trailer position indicates that a trailer for carrying the watercraft 1 is located at a position indicated by the specific mark 45.

In step S106, the second controller 20 executes processes in accordance with the relevant one of the pieces of watercraft operating information. The second controller 20, when described in detail, executes an automated control to automatically move the watercraft 1 with the relevant piece of watercraft operating information. For example, the second controller 20 may move the watercraft 1 to the docking position under automated control. The second controller 20 may select an appropriate one from a plurality of docking positions, while avoiding the trespassing forbidden area. The second controller 20 may move the watercraft 1 to the trailer under automated control. The second controller 20 transmits a command signal to the first controller 10 such that the watercraft 1 is automatically moved in accordance with the watercraft operating information. In response to the command signal, the first controller 10 controls the left and right engines 4A and 4B, the first and second steering actuators 31A and 31B, and the first and second shift actuators 32A and 32B.

Alternatively, the second controller 20 may assist an operator to operate the watercraft 1 using the watercraft operating information. For example, the second controller 20 may stop the watercraft 1 when the operator tries to enter the trespassing forbidden area by mistake although the second controller 20 recognizes the trespassing forbidden area by the mark associated therewith. Alternatively, the second controller 20 may display an image associated with the watercraft operating information on the display 38. For example, the second controller 20 may display a symbol or indicator to represent the docking position on the display 38. The second controller 20 may display a symbol or indicator to represent the route to the docking position on the display 38. The second controller 20 may display a symbol or indicator to represent the trespassing forbidden area on the display 38. The second controller 20 may display a symbol or indicator to represent the trailer position on the display 38.

In the system for operating the watercraft 1 according to the preferred embodiments described above, an image representing a specific mark is recognized in images of the surroundings views of the watercraft 1 shot by the cameras 33 to 36. The specific mark is associated with the watercraft operating information to operate the watercraft 1. Therefore, use of the specific mark recognized in the images enables the watercraft operating information to be obtained in an area in which the watercraft 1 is located. Because of this, operation of the watercraft is easily performed without having to preliminarily obtain information to operate the watercraft.

Preferred embodiments of the present invention have been described above. However, the present invention is not limited to the preferred embodiments described above, and a variety of changes can be made without departing from the gist of the present invention.

The watercraft 1 is not limited to the jetboat; alternatively, the watercraft 1 may be of another type such as a watercraft equipped with an outboard motor. The number of propulsion devices in the watercraft 1 is not limited to two; alternatively, the number of propulsion devices may be less than or greater than two. The propulsion devices in the watercraft 1 are not limited to the jet propulsion devices; alternatively, the propulsion devices may be of another type such as outboard motors. The watercraft 1 may include a side thruster.

The second controller 20 may recognize a specific mark not only in the bird's-eye view image 40 but also in normal images shot by the cameras. The number of cameras is not limited to four; alternatively, the number of cameras may be less than or greater than four. The specific marks are not limited to those described in the preferred embodiments described above: one or more of the specific marks may be replaced by another or others; alternatively, one or more other marks may be added to the specific marks. The specific marks may be a two-dimensional barcode, such as a QR code (registered trademark).

The first and second controllers 10 and 20 may be an integrated controller. Alternatively, the first controller 10 may include a plurality of controllers provided as discrete components. The second controller 20 may include a plurality of controllers provided as discrete components. For example, the process of integrating the bird's-eye view image 40 and the process of image analysis may be executed in a distributed manner by the controllers provided as discrete components.

In the preferred embodiments described above, the control data set is stored in the storage 37 embedded in the watercraft 1. However, the control data set may be stored in a cloud server. The second controller 20 may obtain the watercraft operating information with reference to the control data set stored in the cloud server through a communication network such as the Internet.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A system for operating a watercraft, the system comprising:
   a camera to shoot a surrounding view of the watercraft and produce image data representing an image of the surrounding view of the watercraft; and
   a controller configured or programmed to: obtain the image data;
   recognize an image representing a specific mark in the image data; and
   with reference to a stored control data set defining a relationship between the specific mark and watercraft operating information to operate the watercraft, obtain the watercraft operating information associated with the specific mark recognized in the image data; wherein
   the specific mark includes a character identified based on a pattern, a color, or a shape; and
   the watercraft operating information includes an angle of approach to a docking position of the watercraft.

2. The system according to claim 1, wherein the controller is further configured or programmed to execute an automated control to automatically move the watercraft using the watercraft operating information.

3. The system according to claim 1, wherein the controller is further configured or programmed to assist an operator to operate the watercraft using the watercraft operating information.

4. The system according to claim 1, wherein the watercraft operating information includes the docking position of the watercraft.

5. The system according to claim 1, wherein the watercraft operating information includes a route to the docking position of the watercraft.

6. The system according to claim 1, wherein the watercraft operating information includes a position of a trespassing forbidden area of the watercraft.

7. The system according to claim 1, wherein the watercraft operating information includes a position of a trailer to carry the watercraft.

8. The system according to claim 1, further comprising:
   a display; wherein
   the controller is further configured or programmed to cause the display to display an image in accordance with the watercraft operating information.

9. The system according to claim 1, wherein the controller is further configured or programmed to:
   generate a bird's-eye view image representing the watercraft and the surrounding view of the watercraft based on the image data; and
   recognize the image representing the specific mark in the bird's-eye view image.

10. The system according to claim 1, wherein the controller is further configured or programmed to execute a process in accordance with the watercraft operating information.

11. A method for operating a watercraft comprising:
    obtaining image data representing an image of a surrounding view of the watercraft;
    recognizing an image representing a specific mark in the image data; and with reference to a stored control data set defining a relationship between the
    specific mark and watercraft operating information to operate the watercraft, obtaining the watercraft operating information associated with the specific mark recognized in the image data; wherein
    the specific mark includes a character identified based on a pattern, a color, or a shape; and
    the watercraft operating information includes an angle of approach to a docking position of the watercraft.

12. A watercraft comprising:
    a camera to shoot a surrounding view of the watercraft and produce image data representing an image of the surrounding view of the watercraft; and
    a controller configured or programmed to:
    obtain the image data;
    recognize an image representing a specific mark in the image data; and
    with reference to a stored control data set defining a relationship between the specific mark and watercraft operating information to operate the watercraft,
    obtain the watercraft operating information associated with the specific mark recognized in the image data; wherein
    the specific mark includes a character identified based on a pattern, a color, or a shape; and the watercraft operating information includes an angle of approach to a docking position of the watercraft.

* * * * *